Patented Sept. 6, 1932

1,875,368

UNITED STATES PATENT OFFICE

LEO M. CHRISTENSEN AND WINFRED N. McCUTCHAN, OF TERRE HAUTE, INDIANA, ASSIGNORS TO COMMERCIAL SOLVENTS CORPORATION, OF TERRE HAUTE, INDIANA, A CORPORATION OF MARYLAND

PROCESS OF PRODUCING ACIDS BY FERMENTATION OF CELLULOSIC MATERIALS

No Drawing. Application filed June 14, 1930. Serial No. 461,259.

This invention relates to the production of such materials as acetic and butyric acids, ethyl alcohol methane, hydrogen, carbon dioxide and other useful products by the fermentation of cellulosic materials. More particularly, it relates to the fermentation in such a process, of cellulosic material remaining after the treatment of corncobs and other cellulosic materials with acids for the production of sugars.

In United States Patents Nos. 1,443,881, 1,602,306, and 1,639,571, Herbert Langwell has described methods of fermenting cellulosic material by the aid of thermophilic bacteria which produce acetic and butyric acids, ethyl alcohol, and gases such as carbon dioxide, methane, and hydrogen. According to the method described in these patents, a mash is prepared from some comminuted form of cellulosic material such as, for example, corncobs. This mash is then inoculated with a mixture of organisms capable of producing acetic and butyric acids and of the character ordinarily found in almost any form of fermenting vegetable matter, stable manure, pond mud, septic sewage, tank mud, soil, etc. These organisms are usually found in the intestinal tracts of cellulose-consuming animals, and accordingly a convenient form of inoculum is obtained by selecting material from the center of a steaming stable manure heap or from such other source as is most convenient or suitable. Since these organisms are also usually found on corncobs, it is possible, if desired, to make use of the thermophilic bacteria naturally occurring in the corncobs as the means of inoculating the mash. After inoculation, fermentation is allowed to take place at temperatures ranging from 45° to 70° C., but preferably at temperatures in the neighborhood of 60° C.

Like all protoplasmic bodies, bacteria consist of carbon, oxygen, hydrogen, and nitrogen, together with inorganic salts and varying quantities of phosphorus and sulfur. In order that bacteria may develop and multiply, therefore, they must be supplied with these substances in proper quantities and in suitable form for assimilation. The first theree materials named are present in the cellulose used as the raw material. Certain of the other required materials are usually present in small but insufficient quantities with the raw material used as the source of the cellulosic material. These necessary nutrients are usually supplied in the form of varying proportions of such materials as potassium sulphate, sodium phosphate, ammonium chloride, ammonium sulphate, potassium chloride, distillery wastes such as slops from the butyl-acetonic fermentation process, "steep water", etc.

It has been found that, in general, bacteria which produce acids during the course of a fermentation become less and less active as the concentration of acid in the medium increases. After a certain point is reached, the action of the bacteria becomes neglible unless the acid is removed from the medium. Such a condition is met with in the present case. Langwell, in the patents cited above, has recommended that the hydrogen ion concentration of the fermenting medium be maintained within the limits of about pH 5.0–pH 9.0 measured in the bulk of the mash by the employment of (a) oxides, hydroxides, carbonates or bicarbonates of alkali metals, including ammonium, or (b) oxides, hydroxides, carbonates, or bicarbonates of alkaline earth metals, including magnesium, in which cases compounds of alkali metals which cause the formation of insoluble alkaline earth metal compounds are added from time to time. It is preferred to follow the procedure outlined under (a) in which case it is necessary to make small additions of the neutralizing agent at intervals throughout the course of the fermentation. Whatever method is resorted to, the mash should be agitated at frequent intervals or at least after each addition of neutralizing agent.

In any fermentation process the cost of the raw materials used is one of the most important factors governing the economic success of the process. For the purpose of attempting to reduce the cost of raw materials which could be used in the production of acetic and butyric acids and other useful products by the fermentation of cellulosic materials with thermophilic bacteria, various forms of naturally occurring cellulosic material as well as waste materials from other processes have been investigated. In many cases it has formerly not been found possible to ferment this latter type of material with satisfactory yields for various reasons. A material of this character is that sometimes designated as "xylose residue".

The exact chemical structure of neither cellulose nor cellulose-containing materials is known. It is fairly well established, however, that in different forms of vegetation the cellulose occurs in somewhat different structural forms, for example, $\alpha$, $\beta$, and $\gamma$ cellulose, lignocellulose, pectocellulose, hemicellulose, etc. Attempts have been made to utilize these different forms of cellulose in many different ways. Much attention has been devoted to hydrolyzing various forms of cellulosic material to pentoses such as xylose. This is accomplished, for example, by treating cellulosic materials such as corncobs, corn stalks, sawdust, straw, etc. with a dilute acid such as sulphuric acid, either at ordinary or at elevated temperatures. From corncobs yields of xylose as high as 30–35% may be obtained under favorable conditions, the xylose being formed from the more reactive portions of the cellulose. The more resistant forms of the cellulose may, if desired, be converted to cellobiose, glucose, or polymers of glucose by treatment with concentrated acid. Treating fresh cellulosic material with concentrated acid, however, appears to destroy that portion of this material giving xylose, and little or none of the latter material is obtained. Hence it results that in manufacturing pentoses such as xylose, appreciable amounts of cellulosic materials are left in the solid material remaining at the end of the operation. At the same time, however, the proportions of other unhydrolyzable materials are materially increased. In the commercial production of xylose, for example, by treating corncob meal with hot dilute sulfuric acid, the amount of lignin in the residue amounts to about 48% as compared to about 35% in the untreated material.

Many attempts have been made to ferment this cellulose-containing residue from the manufacture of xylose, as disclosed above for the production of acetic acid and butyric acids and other useful products by fermentation with thermophilic bacteria. For some unknown reason, however, the yields based on the amount of cellulose known to be present were uniformly appreciably lower than the results obtained from cellulosic material, which had not previously been subjected to the hydrolyzing treatment.

It has now been discovered that the former disadvantages inherent in the use of "xylose residue" as a raw material for use in cellulosic fermentation processes may be satisfactorily overcome by employing a modified procedure which consists essentially of regulating the hydrogen ion concentration of the fermenting medium alternately with ammonia or ammonium compounds and then with alkaline materials such as the oxides, hydroxides, carbonates or bicarbonates of alkali metals or alkaline earth metals. Such a procedure results in the production of higher yields of volatile acids than by hitherto used methods. Higher yields are also obtained than when using either of these neutralizing agents alone. The reason for the improved results obtained in this manner is not known, but it appears as if, in addition to the neutralizing action, the ammonium ion under the particular conditions employed, has a stimulating action upon the bacteria or else immunizes them for a time against some toxic agency in the raw material being fermented. Or, it may be that the improved results are due to a combination of these factors.

The process may be satisfactorily operated in a number of ways depending upon the method of conducting the fermentation, the method of recovering the products of the fermentation, the necessity of recovering the neutralizing agents, the method of accomplishing the latter, etc. For example, the fermenting medium may be neutralized, as required, with a mixture of ammonia or ammonium salts and soda ash or alkali metal or alkaline earth metal oxide, hydroxide, carbonate or bicarbonate. Or, if preferred, alternate periods of neutralizing with these two types of materials may be employed. In certain cases, however, where it is required to recover by a particular method as much as possible of the neutralizing agent the procedures just described are not satisfactory and require certain modifications. In a copending application, U. S. Serial No. 407,295, filed November 14, 1929, has been disclosed a continuous method of fermenting cellulosic materials. According to this process, at the conclusion of the fermentation, the greater portion of the fermented mash is removed from the fermentation vessel, approximately 10% being left behind to serve as the inoculum for a subsequent fermentation. When carrying out the fermentation in this manner, ammonia may be used as the neutralizing agent throughout one fermentation and soda ash throughout the succeeding fermentation. Subjecting the bacteria, which are used as the inoculum for the new fermentation, to the action of ammonia or an ammonium compound through one fermentation cycle lasting for several days and then to the action of the alkali or alkaline earth neutralizing agent through a similar succeeding cycle appears to be sufficient to give the desired improved results.

In carrying out the present improved process, a mash is made up from comminuted xylose residue in sufficient quantity to give, say 6–7% concentration by weight, altho other concentrations may also be employed. The mash may be made up with water, in which case it is customary to add nutrients in the form of such materials as potassium sulphate, potassium chloride, sodium phosphate, ammonium chloride, etc. In case distillery wastes, such as butyl acetonic fermentation slops, are employed as the source of the nutrients the mash may be made up wholly or in part from the distillery slop instead of water, depending principally upon the concentration of the distillery waste. The hydrogen ion concentration of the mash is then regulated so as to be within the limits pH 9 and pH 5, and preferably at pH 7.3 measured within the bulk of the mash with either (a) ammonia, ammonium carbonate, or ammonium bicarbonate, or (b) soda ash or other alkali metal or alkaline earth metal, oxide, hydroxide, carbonate or bicarbonate. After inoculating with thermophilic bacteria capable of fermenting cellulosic material and producing such materials as acetic and butyric acids and other useful products, fermentation is allowed to take place at temperatures ranging from 50° to 70° C. and preferably at about 60° C. During the fermentation the hydrogen ion concentration of the fermenting mash is maintained within the abovementioned limits by further additions of either the neutralizing agents designated under (a) or (b) or of mixtures of compounds selected from each group. In case the neutralization during the entire fermentation period is effected by the aid of agents selected from only one of these groups, inoculum for a subsequent fermentation is taken from this fermenting mash and a neutralizing agent selected from the alternate group used during the succeeding fermentation period. In this way a fermentation cycle is obtained whereby the same bacteria are carried through a series of fermentations alternately neutralized with compounds of groups (a) and (b). Instead of alternating the neutralizing agent during a particular fermentation or even during succeeding fermentation cycles, the neutralizing agent may only be changed as often as needed to give the desired results. At the conclusion of the fermentation the products formed may be recovered in a number of ways, the particular one chosen depending upon a number of factors which need not be considered at this point.

In the table following are shown average results from a series of experiments carried out as hereinabove disclosed. In each case the mash was made up from wet xylose residue and distillery slop from the butyl acetonic fermentation industry. In each case 10% of mash from a preceding fermentation was used as the inoculum. The fermentations were carried out at a temperature of 60° C. and the hydrogen ion concentration was regulated to approximately pH 7.3 by the addition twice each day of the indicated neutralizing agent. The ammonia used in these fermentations was either the anhydrous or the 26% aqua grades. There are a number of fermentations of each kind included in these average results.

Table

| Neutralizing agent | | Xylose residue concentration G/100 c. c. | Total volatile acid concentration G/100 c. c. | Volatile acid ratio acetic per cent of total | Total volatile acid yield per cent of xylose residue |
| --- | --- | --- | --- | --- | --- |
| For fermentation | For preceding fermentation | | | | |
| Ammonia | Soda ash | 6.51 | 2.12 | 85.6 | 32.6 |
| Soda ash | Ammonia | 6.70 | 2.40 | 85.3 | 35.8 |
| Soda ash | Ammonia | 6.71 | 2.32 | 85.4 | 34.6 |
| Soda ash | Soda ash | 6.08 | 1.84 | 85.2 | 30.4 |
| Soda ash | Soda ash | 7.00 | 1.74 | 85.6 | 24.9 |
| Ammonia | Ammonia | 6.52 | 2.03 | 85.7 | 31.2 |
| Ammonia | Ammonia | 7.00 | 1.92 | 85.5 | 27.4 |

The results shown above indicate a very distinct improvement in yields when using the alternate neutralization process set forth herein. Using ammonia as the only neutralizing agent will generally give somewhat better yields than when using soda ash alone as the neutralizing agent. The improved results shown by the use of the former are gradually lost after a period of time but by subjecting the bacteria to the alternate action of the two types of neutralizing agents either during a single fermentation cycle or in alternate fermentations over a series of cycles gives distinctly higher yields than by the use of either type of neutralizing agent alone. In any process such as the present where the cost of the raw material being fermented represents such a large percentage of the total cost of operating the process, even slight increases in yields are highly important.

Now having described our invention, what we desire to claim as new and novel is:

1. In a process for the fermentation of cellulosic material with thermophilic bacteria, the step which comprises maintaining the hydrogen ion concentration of the fermenting medium within the desired limits during the fermentation cycle by the alternate use of ammonia and soda ash.

2. In a process for the fermentation of xylose residue with thermophilic bacteria, the step which comprises maintaining the hydrogen ion concentration of the fermenting medium within the desired limits during the fermentation cycle by the alternate use of ammonia and soda ash.

3. In a process for the fermentation of xylose residue with thermophilic bacteria, the step which comprises maintaining the hydrogen ion concentration of the fermenting medium within the desired limits during the fermentation cycle by the use of ammonia and soda ash.

4. In a process for the fermentation of cellulosic materials by means of thermophilic bacteria, the steps which comprise neutralizing the fermenting medium with a neutralizing agent selected from one of the groups consisting of (a) ammonia, ammonium carbonate and ammonium bicarbonate, and (b) oxides, hydroxides, carbonates and bicarbonates of alkali metals and alkaline earth metals, allowing the fermentation to proceed and subsequently neutralizing the fermenting medium with a neutralizing agent selected from the group not used in the previous neutralization.

5. In a process for the fermentation of xylose residue by means of thermophilic bacteria, the steps which comprise neutralizing the fermenting medium with a neutralizing agent selected from one of the groups consisting of (a) ammonia, ammonium carbonate and ammonium bicarbonate, and (b) oxides, hydroxides, carbonates and bicarbonates of alkali metals and alkaline earth metals, allowing the fermentation to proceed and subsequently neutralizing the fermenting medium with a neutralizing agent selected from the group not used in the previous neutralization.

6. In a process for the fermentation of cellulosic materials, the step which comprises effecting the fermentation with thermophilic bacteria which were utilized in a previous fermentation, said previous fermentation having been neutralized with a neutralizing agent selected from one of the groups consisting of (a) ammonia, ammonium carbonate and ammonium bicarbonate, and (b) oxides, hydroxides, carbonates and bicarbonates of alkali metals and alkaline earth metals, and maintaining the hydrogen ion concentration within the bulk of the fermenting mash within the desired limits by means of a neutralizing agent selected from the group not used in the previous fermentation.

7. In a process for the fermentation of xylose residue, the step which comprises effecting the fermentation with thermophilic bacteria which were utilized in a previous fermentation, said previous fermentation having been neutralized with a neutralizing agent selected from one of the groups consisting of (a) ammonia, ammonium carbonate and ammonium bicarbonate, and (b) oxides, hydroxides, carbonates and bicarbonates of alkali metals and alkaline earth metals, and maintaining the hydrogen ion cencentration within the bulk of the fermenting mash within the desired limits by means of a neutralizing agent selected from the group not used in the previous fermentation.

8. In a process for the fermentation of cellulosic materials, the step which comprises effecting the fermentation with thermophilic bacteria which were utilized in a previous fermentation, said previous fermentation having been neutralized with ammonia, and maintaining the hydrogen ion concentration within the bulk of the fermenting mash within the desired limits by means of soda ash.

9. In a process for the fermentation of xylose residue, the step which comprises effecting the fermentation with thermophilic bacteria which were utilized in a previous fermentation, said previous fermentation having been neutralized with ammonia, and maintaining the hydrogen ion concentration within the bulk of the fermenting mash within the desired limits by means of soda ash.

10. In a process for the fermentation of cellulosic materials, the step which comprises effecting the fermentation with thermophilic bacteria which were utilized in a previous fermentation, said previous fermentation having been neutralized with soda ash, and maintaining the hydrogen ion concentration within the bulk of the fermenting mash within the desired limits by means of ammonia.

11. In a process for the fermentation of xylose residue, the step which comprises effecting the fermentation with thermophilic bacteria which were utilized in a previous fermentation, said previous fermentation having been neutralized with soda ash, and maintaining the hydrogen ion concentration within the bulk of the fermenting mash within the desired limits by means of ammonia.

In testimony whereof we affix our signatures.

LEO M. CHRISTENSEN.
WINFRED N. McCUTCHAN.